US012789933B2

(12) United States Patent
Botta et al.

(10) Patent No.: US 12,789,933 B2
(45) Date of Patent: Nov. 10, 2026

(54) VEHICLE

(71) Applicant: Indian Motorcycle International, LLC, Medina, MN (US)

(72) Inventors: Matthias Botta, Brügg (CH); Andy Ellsworth, Cambridge, MN (US)

(73) Assignee: INDIAN MOTORCYCLE INTERNATIONAL, LLC, Medina, MN (US)

( * ) Notice: Subject to any disclaimer, the term of this patent is extended or adjusted under 35 U.S.C. 154(b) by 0 days.

(21) Appl. No.: 18/691,128

(22) PCT Filed: Sep. 9, 2022

(86) PCT No.: PCT/US2022/076191
§ 371 (c)(1),
(2) Date: Mar. 12, 2024

(87) PCT Pub. No.: WO2023/039516
PCT Pub. Date: Mar. 16, 2023

(65) Prior Publication Data

US 2024/0400145 A1 Dec. 5, 2024

Related U.S. Application Data

(60) Provisional application No. 63/243,482, filed on Sep. 13, 2021.

(51) Int. Cl.
*B62J 25/06* (2020.01)
*B60T 7/04* (2006.01)
(Continued)

(52) U.S. Cl.
CPC ............... *B62J 25/06* (2020.02); *B62K 11/04* (2013.01); *B62L 3/04* (2013.01); *B60T 7/04* (2013.01); *B62K 23/08* (2013.01)

(58) Field of Classification Search
CPC .......... B62J 25/06; B60K 11/04; B60K 23/08; B60T 7/04; B60T 7/06; B62L 3/04
See application file for complete search history.

(56) References Cited

U.S. PATENT DOCUMENTS 1,078,308 A * 11/1913 Pfleider .................. B62K 11/04 180/219
1,120,111 A * 12/1914 White .................... B62K 11/04 280/284

(Continued)

FOREIGN PATENT DOCUMENTS

CN 111976879 A * 11/2020 ................ B62L 1/00
FR 702611 A * 4/1931

(Continued)

OTHER PUBLICATIONS

International Search Report and Written Opinion issued by the International Searching Authority, dated Dec. 6, 2022, for International Patent Application No. PCT/US2022/076191; 7 pages.

(Continued)

*Primary Examiner* — Adam D Rogers
(74) *Attorney, Agent, or Firm* — SCHWEGMAN LUNDBERG & WOESSNER, P.A.

(57) ABSTRACT

A foot support is directly supported by a structurally stressed but removable part of a vehicle frame. In particular, a foot support assembly includes a frame member and a foot support, such as a foot peg. The frame member forms a part of the load-bearing structure of the frame assembly, and the foot support is mounted to the frame member without any intervening brackets or components therebetween. The frame member is fixed at each end to a respective frame component and is configured to bear a portion of the load supported by the frame assembly. In some applications, frame components may include stressed engine members, such as a crankcase.

20 Claims, 8 Drawing Sheets

(51) Int. Cl.

| | |
|---|---|
| ***B62K 11/02*** | (2006.01) |
| ***B62K 11/04*** | (2006.01) |
| ***B62K 23/08*** | (2006.01) |
| ***B62L 3/04*** | (2006.01) |

(56) References Cited

U.S. PATENT DOCUMENTS

| | | | | | |
|---|---|---|---|---|---|
| 1,121,168 | A * | 12/1914 | Cobb | B62K 11/04 280/277 |
| 5,354,086 | A * | 10/1994 | Mueller | B62J 25/06 74/564 |
| 6,846,018 | B2 * | 1/2005 | Dennert | B62K 11/04 180/219 |
| 9,809,268 | B2 * | 11/2017 | Shigihara | B62L 3/04 |
| 10,220,903 | B2 * | 3/2019 | LaCasse-Jobin | B62M 17/00 |
| 10,730,587 | B2 * | 8/2020 | Yaffe | B62J 25/04 |
| 11,110,983 | B1 * | 9/2021 | Stark | B62J 25/06 |
| 11,904,982 | B2 * | 2/2024 | Soatti | F16H 61/12 |
| 12,110,076 | B2 * | 10/2024 | Tanaka | B62K 25/286 |
| 2003/0222425 | A1 | 12/2003 | Dennert et al. | |
| 2006/0254844 | A1 | 11/2006 | Nakashima | |
| 2007/0012500 | A1 | 1/2007 | Brown et al. | |
| 2016/0297493 | A1 | 10/2016 | Lacasse-Jobin | |
| 2017/0101149 | A1 | 4/2017 | Lenton | |
| 2019/0315429 | A1 | 10/2019 | Laberge | |
| 2021/0122441 | A1 * | 4/2021 | Eder | B62K 23/08 |

FOREIGN PATENT DOCUMENTS

| | | | |
|---|---|---|---|
| JP | 2009214718 | A | 9/2009 |
| JP | 5067297 | B2 * | 11/2012 |
| JP | 2017197103 | A | 11/2017 |

OTHER PUBLICATIONS

"European Application Serial No. 22868332.2, Extended European Search Report mailed Jun. 26, 2025", 10 pgs.

"Japanese Application Serial No. 2024-515370, Notification of Reasons for Refusal mailed Apr. 22, 2025", With English Machine Translation, 10 pgs.

"Japanese Application Serial No. 2024-515370, Notification of Reasons for Refusal mailed Dec 18, 2025", w/ English Translation, 9 pgs.

"Japanese Application Serial No. 2024-515370, Response filed Sep. 22, 2025 to Notification of Reasons for Refusal mailed Apr. 22, 2025", W/ English Claims, 19 pgs.

"European Application Serial No. 22868332.2, Response filed Jan. 12, 2026 to Extended European Search Report mailed Jun. 26, 2025", 18 pgs.

"International Application Serial No. PCT US2022 076191, International Preliminary Report on Patentability mailed Mar. 28, 2024", 7 pgs.

"European Application Serial No. 22868332.2, Response to Communication pursuant to Rules 1611 and 162 EPC filed Jul. 5, 2024", 9 pgs.

"Japanese Application Serial No. 2024-515370, Response filed Apr. 14, 2026 to Examiners Decision of Final Refusal mailed Jan. 6, 2026", W English Claims, 19 pgs.

"Chinese Application Serial No. 202280061300.3, Office Action mailed Jul. 17, 2026", W English Translation, 19 pgs.

* cited by examiner

VEHICLE

CROSS-REFERENCE TO RELATED APPLICATIONS

The present application is a national stage entry of International (PCT) Patent Application Number PCT/US2022/076191, filed Sep. 9, 2022, which claims priority to U.S. Provisional Patent Application No. 63/243,482, filed Sep. 13, 2021, and entitled VEHICLE, the complete disclosures of which are hereby incorporated herein by reference.

FIELD OF THE DISCLOSURE

The present disclosure relates to a vehicle and, more particularly, to a vehicle with a straddle seat and an efficient frame configuration.

BACKGROUND OF THE DISCLOSURE

Vehicles with straddle seats include motorcycles, all-terrain vehicles (ATVs) and snowmobiles, for example. Such vehicles typically support a rider's feet with foot supports, such as foot pegs or foot boards (sometimes referred to as floorboards). Foot controls, such as brake pedals or shifters, may also be located near the foot supports.

In predicate designs, foot supports are supported by separate brackets bolted to a frame of the vehicle, with the frame structure and the bracket being separate components. What is needed is an improvement over the foregoing.

SUMMARY OF THE DISCLOSURE

The present disclosure provides a foot support which is directly supported by a structurally stressed but removable part of a vehicle frame. In particular, a foot support assembly includes a frame member and a foot support, such as a foot peg. The frame member forms a part of the load-bearing structure of the frame assembly, and the foot support is mounted to the frame member without any intervening brackets or components therebetween. The frame member is fixed at each end to a respective frame component and is configured to bear a portion of the load supported by the frame assembly. In some applications, frame components may include stressed engine members, such as a crankcase.

In one form thereof, the present disclosure provides a foot support assembly for a vehicle, including a frame member having a first end configured to be fixed to a first frame component and a second end configured to be fixed to a second frame component, and a foot support connected directly to the frame member and sized to support a foot of a vehicle operator.

In another form thereof, the present disclosure provides a vehicle including an engine, a frame supporting the engine, the frame having at least a first frame component and a second frame component spaced from the first frame component to define a gap, a plurality of ground engaging members, at least one of the plurality of ground engaging members operably connected to the engine and a foot support assembly. The foot support assembly includes a frame member positioned in the gap and removably fixed to the first and second frame components, such that the frame member creates a load-bearing, force-transferring link between the first frame component and the second frame component, and a foot support connected directly to the frame member and sized to support a foot of a vehicle operator.

BRIEF DESCRIPTION OF THE DRAWINGS

The above-mentioned and other features and advantages of this disclosure, and the manner of attaining them, will become more apparent and will be better understood by reference to the following description of exemplary embodiments taken in conjunction with the accompanying drawings, wherein.

Corresponding reference characters indicate corresponding parts throughout the several views. The exemplifications set out herein illustrate exemplary embodiments of the invention and such exemplifications are not to be construed as limiting the scope of the invention in any manner.

DETAILED DESCRIPTION OF THE DRAWINGS

Figure 1:
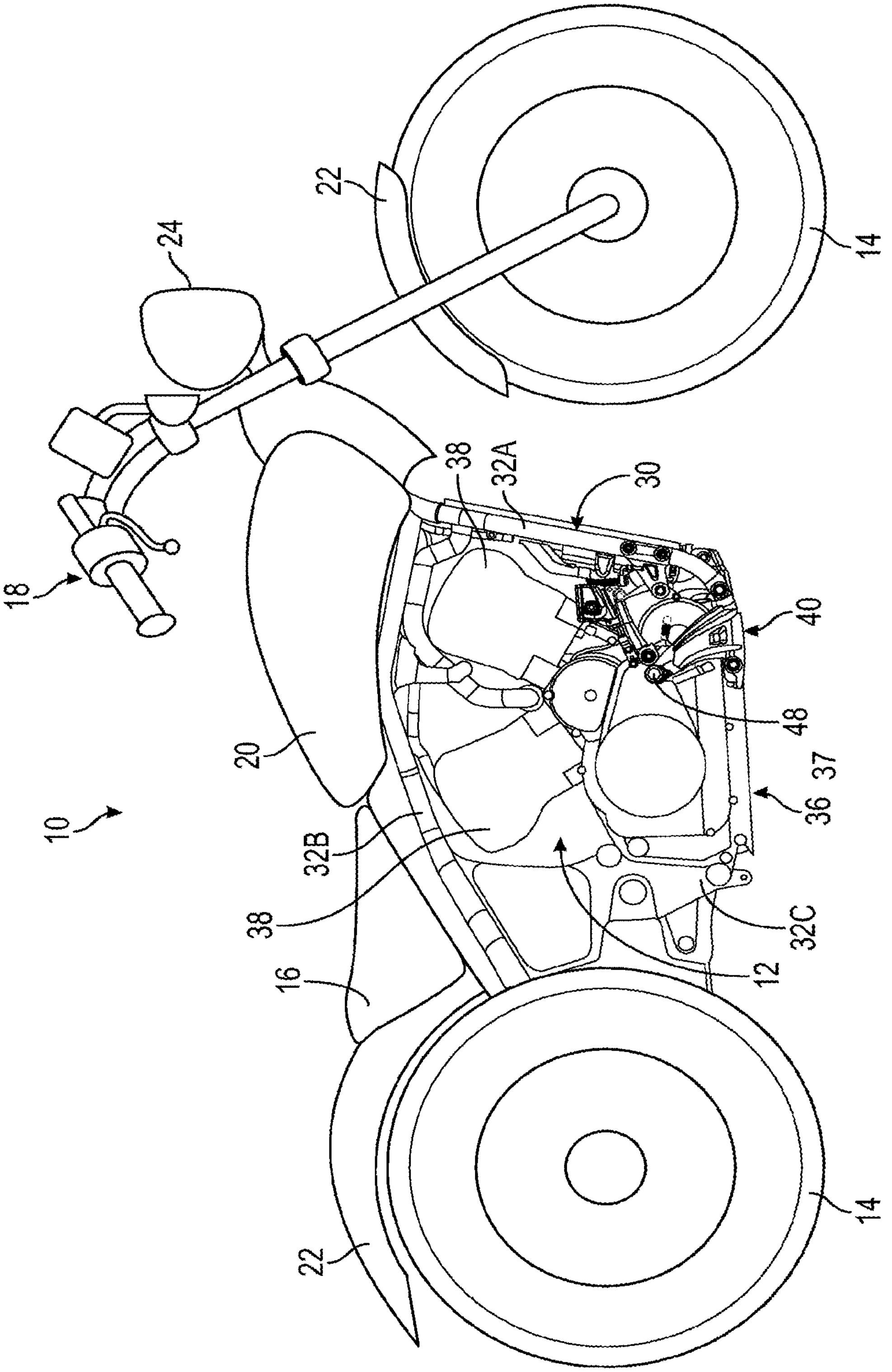
FIG. 1 is an elevation view of a first exemplary vehicle having a foot support assembly made in accordance with the present disclosure.

For the purposes of promoting an understanding of the principles of the present disclosure, reference is now made to the embodiments illustrated in the drawings, which are described below. The embodiments disclosed below are not intended to be exhaustive or limit the present disclosure to the precise form disclosed in the following detailed description. Rather, the embodiments are chosen and described so that others skilled in the art may utilize their teachings. Therefore, no limitation of the scope of the present disclosure is thereby intended. Corresponding reference characters indicate corresponding parts throughout the several views.

The present disclosure provides vehicles with a foot support assembly 40 which integrates a foot support, such as foot peg 48, into the frame assembly 30 as a stressed member, rather than providing a separate bracket connected to the frame assembly 30 for support of the foot peg 48. In the illustrative embodiment shown in FIG. 2 and further described below, foot support assembly 40 includes a frame member 42 to which foot peg 48 is directly connected, and which is itself directly connected to frame assembly 30 as a load-bearing component thereof.

Turning now to FIG. 1, a first exemplary vehicle is shown as motorcycle 10 including straddle seat 16. Motorcycle 10 includes a frame assembly 30 which cradles and supports engine 12. In the illustrated embodiment, engine 12 has a V-twin configuration with two cylinders 38 which drive a crankshaft located in crankcase 36. A transmission 37 may also be housed by crankcase 36. Straddle seat 16 and fuel tank 20 are supported atop frame assembly 30, with a driven rear wheel 14 at the rear portion of frame assembly 30 and a front wheel forward of frame assembly 30. Each of the wheels 14 may have a fender 22. Forward of the straddle seat 16 and fuel tank 20, operator controls 18 provide for hand operation of vehicle functions, such as throttle, clutch, front brake and signaling functions. A headlight may be mounted forward of controls 18.

Figure 7:
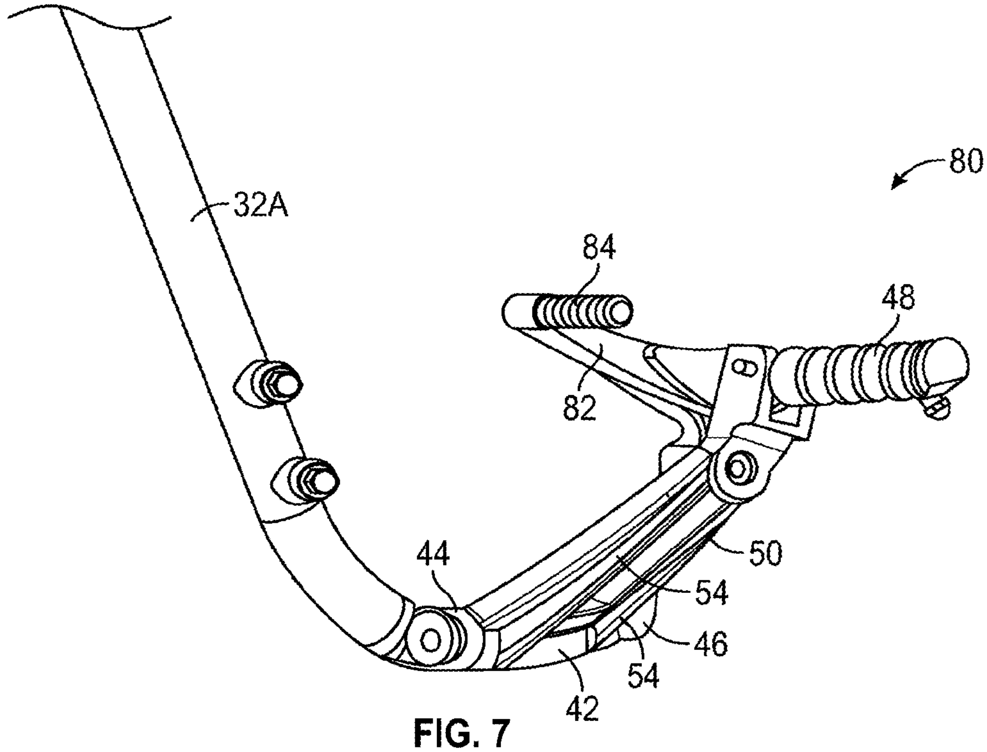
FIG. 7 is another perspective view of a portion of the frame of FIG. 6, illustrating details of the second foot support assembly.

Motorcycle 10 also includes foot-operated controls, such as a brake lever 60 with a brake pedal 62 (FIG. 3) and a shifter lever 82 with a shift pedal 84 (FIG. 7). Each pedal 62, 84 is positioned to be actuated by an operator's foot while the operator's foot is resting on the foot support of foot support assembly 40, 80, such as foot pegs 48. Each of these foot-operated controls may be integrated to frame assembly 30 via foot support assemblies 40, 80 made in accordance with the present disclosure, in which a frame member 42 is integrated as a load-bearing, force-transferring component within the overall load-bearing structure of frame assembly 30.

Figure 2:
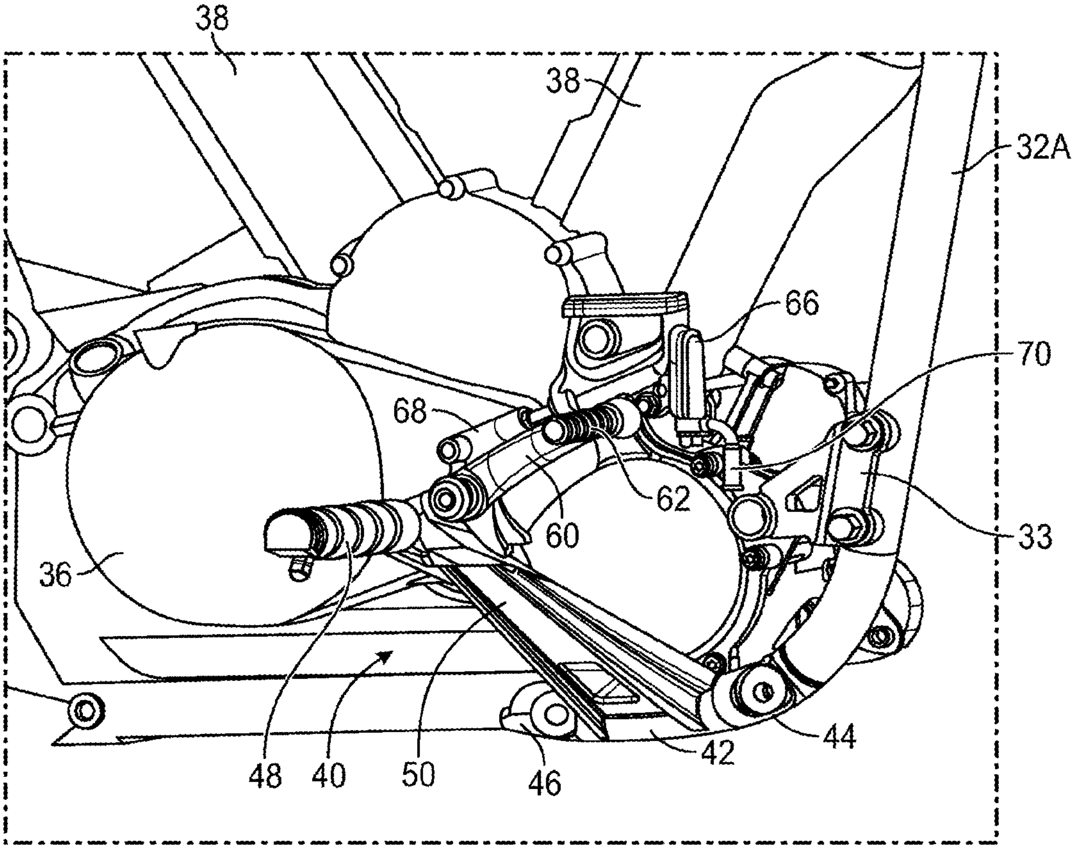
FIG. 2 is an enlarged view of a portion of the vehicle of FIG. 1, illustrating details of the foot support assembly and surrounding structures.

As best illustrated in FIG. 1, frame assembly 30 includes a front tubular component 32A (also called a down tube), a top tubular component 32B (also called a top tube) and a rear frame component 32C. The tubular frame components 32A, 32B may also take other forms, such as aluminum castings, as required or desired for a particular application. The load-bearing "loop" of these components may be completed by a lower frame member, which may be a separate frame member or, in the illustrated embodiment, may be a structural component of engine 12 such as crankcase 36. Turning to FIG. 2, foot support assembly 40 is shown bridging a gap defined between two frame components, namely, front tubular component 32A and crankcase 36. When foot support assembly 40 is positioned in this gap and fixed to the component 32A and crankcase 36, as described further below, the frame member 42 of assembly 40 creates a force-transferring link between the component 32A and crankcase 36 and becomes part of the load-bearing overall structure of frame assembly 30.

Figure 5:
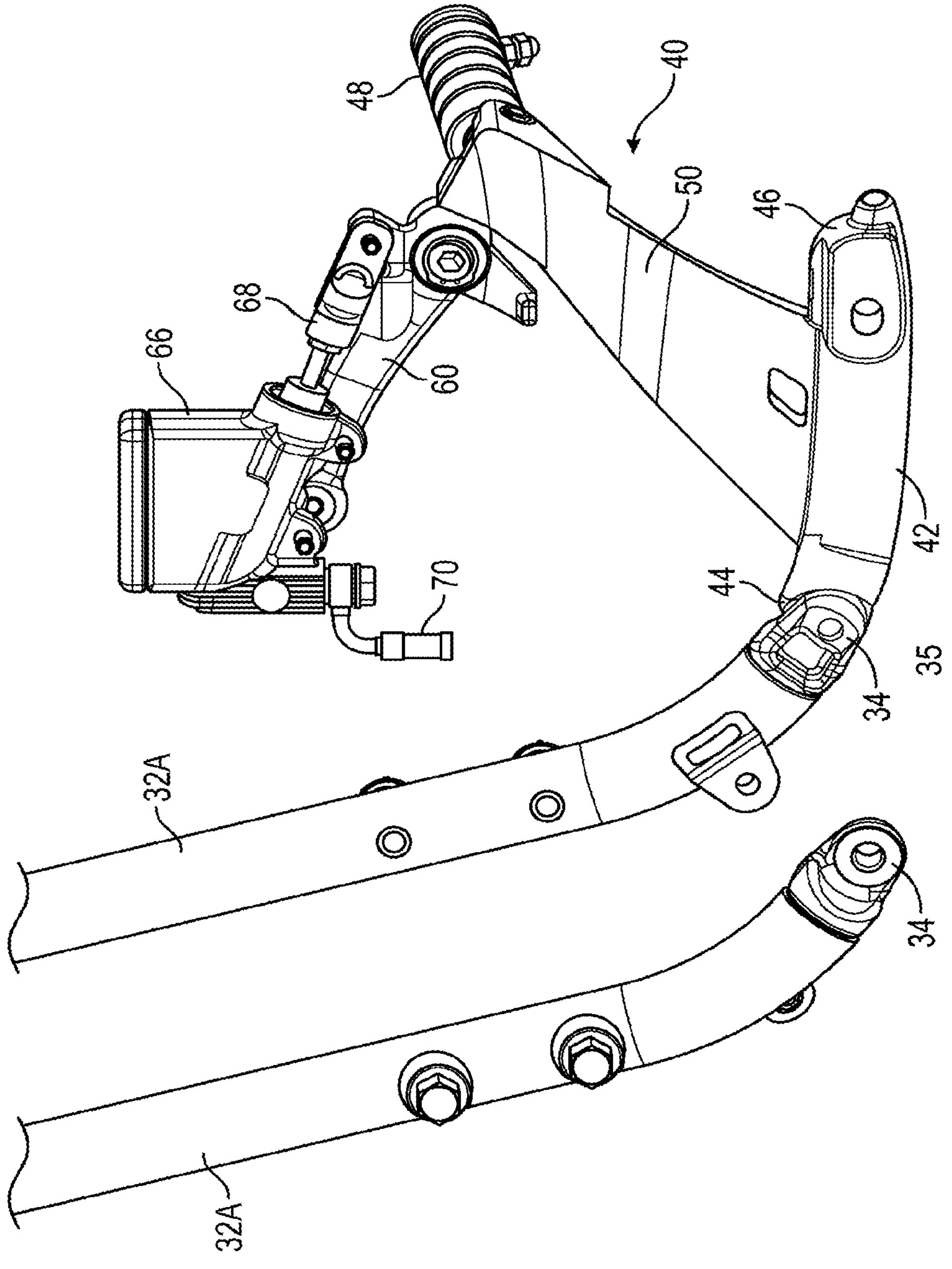
FIG. 5 is perspective view of the frame and foot support assembly shown in FIG. 3.

Frame member 42 is fixed at its forward end 44 to tubular frame component 32A via end fitting 34, as best seen in FIG. 5. End fitting 34 may be a forged part sized to fit into the terminal open end of frame component 32A and present a threaded aperture 35 configured to receive a bolted connection through the forward end 44 of frame member 42. The opposing rear end 46 of frame member 42 is similarly configured to receive a bolt therethrough, but the bolt is instead received in a threaded aperture tapped into structural material of crankcase 36, illustratively along its lower portion. In the illustrated embodiment, the force-transferring gap is between the rear end of frame component 32A and the crankcase 36, though of course other frame structures may have other gaps formed between the components. In the illustrated embodiment, the components of frame assembly 30, and frame member 42 of foot support assembly 40, may be made of steel or aluminum.

Crankcase 36 may also have a separate load-bearing, force-transferring link between front frame component 32A and rear frame component 32C that is not dependent on foot support assembly 40. In the illustrative embodiment of FIG. 2, for example, a separate frame mounting bracket 33 may be provided which is fixed to crankcase 36 at a location above the attachment point between frame component 32A and frame member 42. This allows removal and installation of foot support assembly 40 while motorcycle 10 is at rest, without compromising the ability of frame assembly 30 to support engine 12 and other components. When motorcycle 10 is in use, the additional load-bearing connection created by frame member 42 of assembly 40 absorbs dynamic loads and contributes to the overall rigidity and performance of frame assembly 30.

The bolted connection described above allows removal of foot support assembly 40. This removability, in turn, facilitates the modular replacement of one foot support assembly 40 with another one having different geometry. This allows a user to change his or her foot position relative to straddle seat 16, such that motorcycle 10 may have a modular, customizable look, geometry and rider fit.

Figure 3:
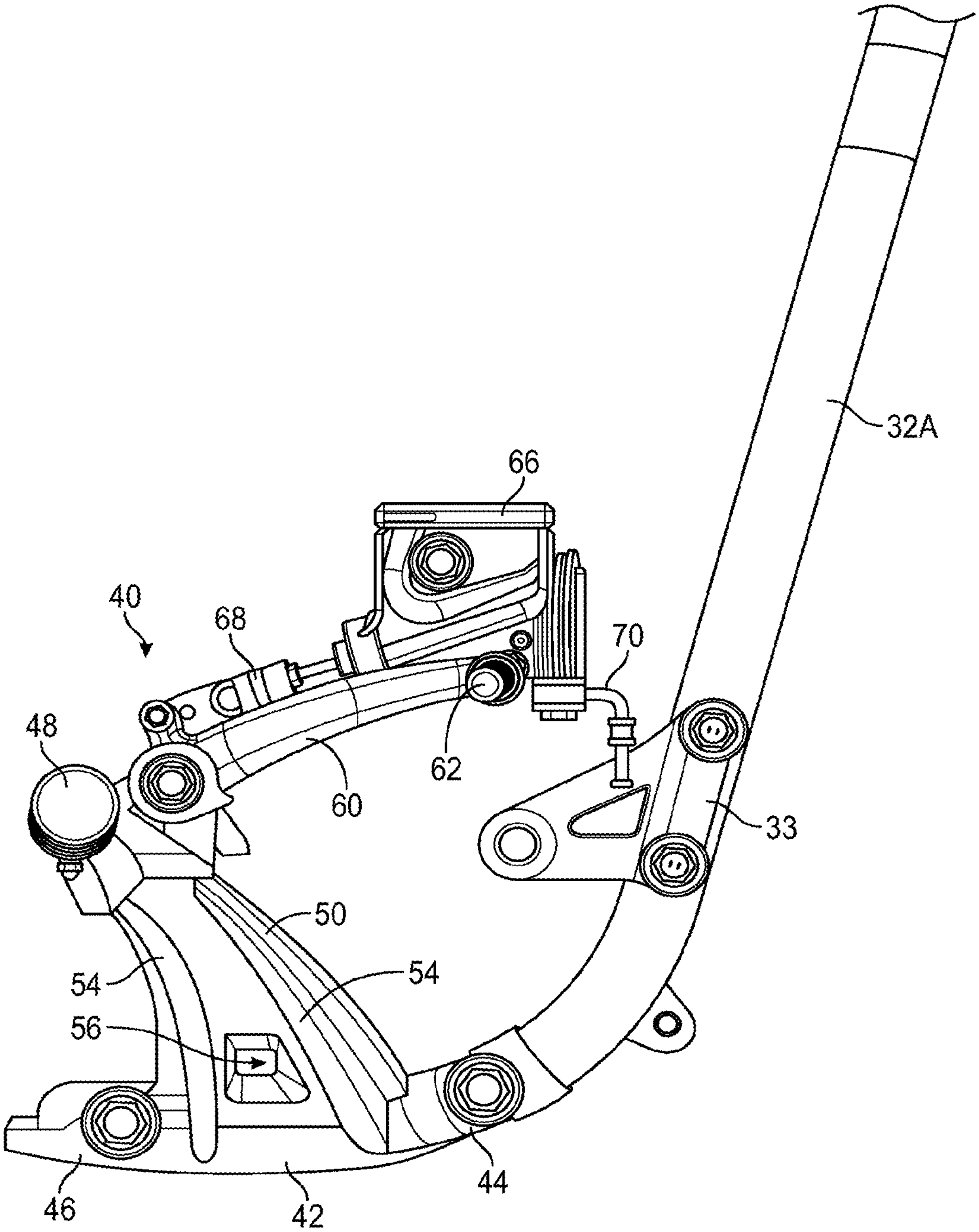
FIG. 3 is an elevation view of a portion of the frame of the vehicle of FIG. 1, having the foot support assembly attached thereto.
Figure 4:
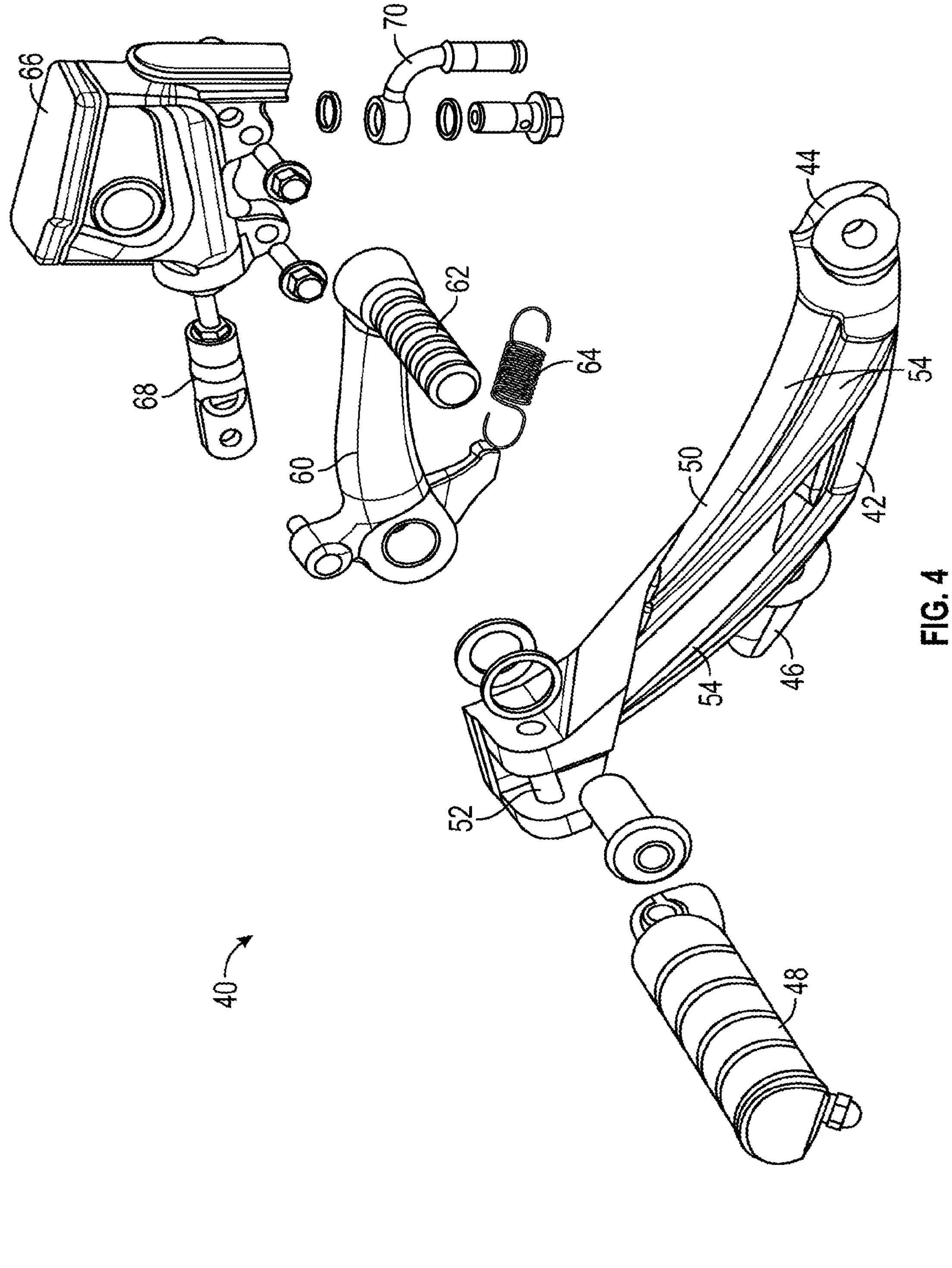
FIG. 4 is an exploded perspective view of the foot support assembly of FIG. 1, with associated operator control components.

Turning now to FIGS. 3 and 4, the details of foot support assembly 40 and its interfacing components is shown in greater detail. Frame member 42 includes stanchion 50 extending laterally and upwardly away from a longitudinal axis extending along the generally tubular frame member 42 from rear end portion 46 to front end portion 44. However, stanchion 50 may extend entirely laterally, or entirely upwardly, away from the adjacent frame member as required or desired for a particular application. Stanchion 50 is integrally fixed to the lower, generally longitudinal portion of frame member 42 to form a monolithic, one-piece component. For example, stanchion 50 may be welded to the longitudinal portion of frame member 42, or the two parts may be formed as a single casting, forging, or machined component. Stanchion may be generally tapered from a wide interface at its junction with the longitudinal portion of frame member 42 to a narrow upper/outer free end portion having an attachment point or mount for connection to foot peg 48. In the illustrated embodiment, the upper connection 52 is a pivot connection which allows foot peg 48 to be pivotably connected to stanchion 50 of frame member 42. In the context of motorcycle 10 illustrated in FIG. 1, this may allow foot peg 48 to pivot upwardly. Foot peg 48 is connected directly to frame member 42, where stanchion 50 is considered to be a part of frame member 42 because it is integrally, monolithically formed as part thereof. Alternatively, in some designs stanchion 50 may be eliminated and foot peg 48 may be directly connected to the load-bearing portion of frame member 42.

Stanchion 50 includes a series of ribs 54 extending along its upward/outward direction from the wider base toward the narrower end upper/outer end connection 52. Ribs 54 stiffen stanchion 50 with minimal added material, weight and cost. One or more apertures 56 may be provided in low-stress areas to further reduce material, weight and cost.

As best seen in FIG. 3, brake lever 60 is pivotably mountable to stanchion 50, though it is also contemplated that brake lever 60 can be coupled directly to another component, such as the transmission 37 of motorcycle 10 or engine 12 (FIG. 2). Brake lever 60 has a length that positions the brake pedal 62 to be actuated by an operator's foot while the operator's foot (i.e., the ball or toe of the operator's foot) while the operator's foot is resting on the foot support 48 (i.e., the heel or arch of the operator's foot). In the illustrated embodiment, the brake is a hydraulic brake in which downward pivoting of the brake lever 60 and brake pedal 62 actuates brake actuator 68, which in turn transfers hydraulic fluid from reservoir 66 through brake line 70 to actuate a brake master cylinder and a brake shoe or caliper (not shown). Mechanical brakes, where pivoting of a brake arm moves a cable through a housing or actuates a linkage, may also be used. In a typical motorcycle application, actuation of brake pedal 62 actuates a brake operating on the rear wheel 14 (FIG. 1).

Figure 6:
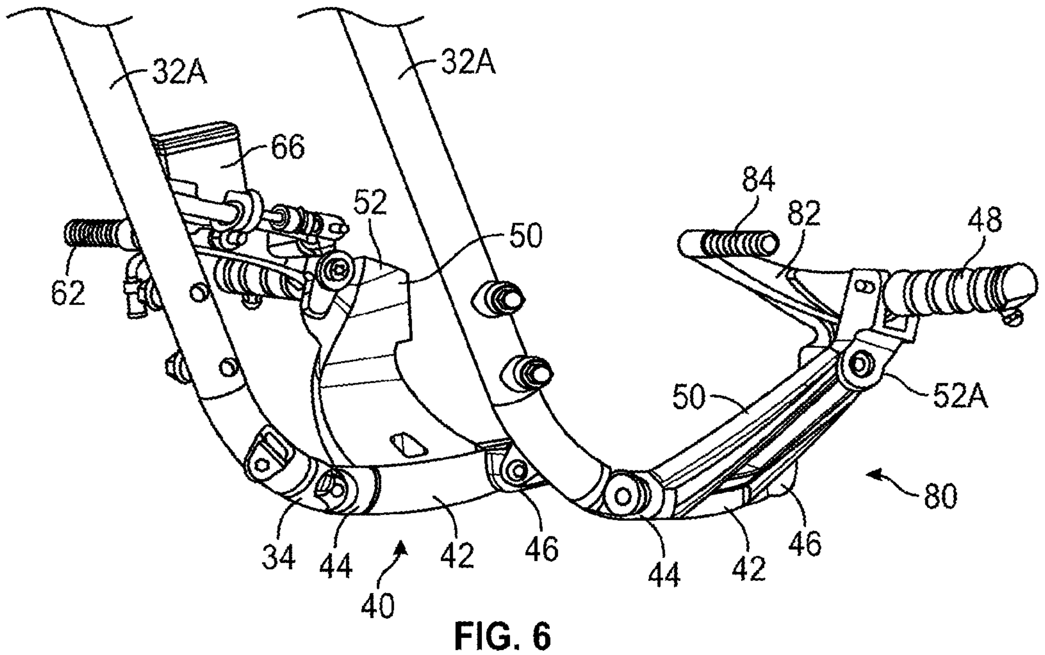
FIG. 6 is a perspective view of the frame of FIG. 5, with a second foot support assembly attached thereto and additional operator control components.

In addition to the brake-side (e.g., right-side) foot support assembly 40, motorcycle 10 may include a shifter-side (e.g., left-side) foot support assembly 80 shown in FIGS. 6 and 7. Assembly 80 may be nearly or entirely mirror images of one another, but may vary as required or desired for a particular application. Foot support assembly 80, as shown, includes the same frame member 42 and stanchion 50 as assembly 40 described above, but has a modified upper end 52A designed to accept a pivot connection between shifter lever 82 and stanchion 50. Upper end 52A also pivotably attaches to foot peg 48 in the same manner as discussed above with respect to assembly 40. As noted above, brake lever 60 may pivotably attach to engine 12, as shown, or may be pivotably attached to stanchion 50 in the same manner shown in FIGS. 6 and 7. Similarly, shifter lever 82 may pivotably attach either to stanchion 50 as shown, or may be pivotably attached to another component such as the transmission 37 or the engine 12.

Shifter lever 82 is sized and configured to position shift pedal 84 for actuation by an operator's foot while the operator's foot rests on foot peg 48, in the same or substantially the same manner as described above with respect to brake lever 60 and brake pedal 62. Shift lever 82 is operably connected (e.g., through a linkage connection) to athe transmission 37 defining a plurality of gear ratios, which may be housed in crankcase 36 as noted above. The operator moves the shift pedal 84 up or down to shift the transmission 37 between the plurality of gear ratios.

A vehicle, such as motorcycle 10, may use one or both of foot support assemblies 40, 80 for right and left sides. Moreover, all the discussion herein regarding foot support assembly 40 also applies to foot assembly 80, except as otherwise explicitly noted. Advantageously, the use of foot support assemblies 40 and/or 80 reduced the overall parts count of the vehicle, and enables more compact packaging by combining multiple functionalities (i.e., frame component and foot support) into a single component (i.e., frame member 42 and its associated structures and parts).

For purposes of the present disclosure, foot pegs 48 of motorcycle have been shown and described as an illustrative foot support used in connection with foot support assembly 40. However, it is understood that other foot support members, such as floor boards, highway pegs or other driver foot peg alternatives or supplements sized to support the foot of a vehicle operator may also be used as a part of foot support assembly 40.

Figure 8:
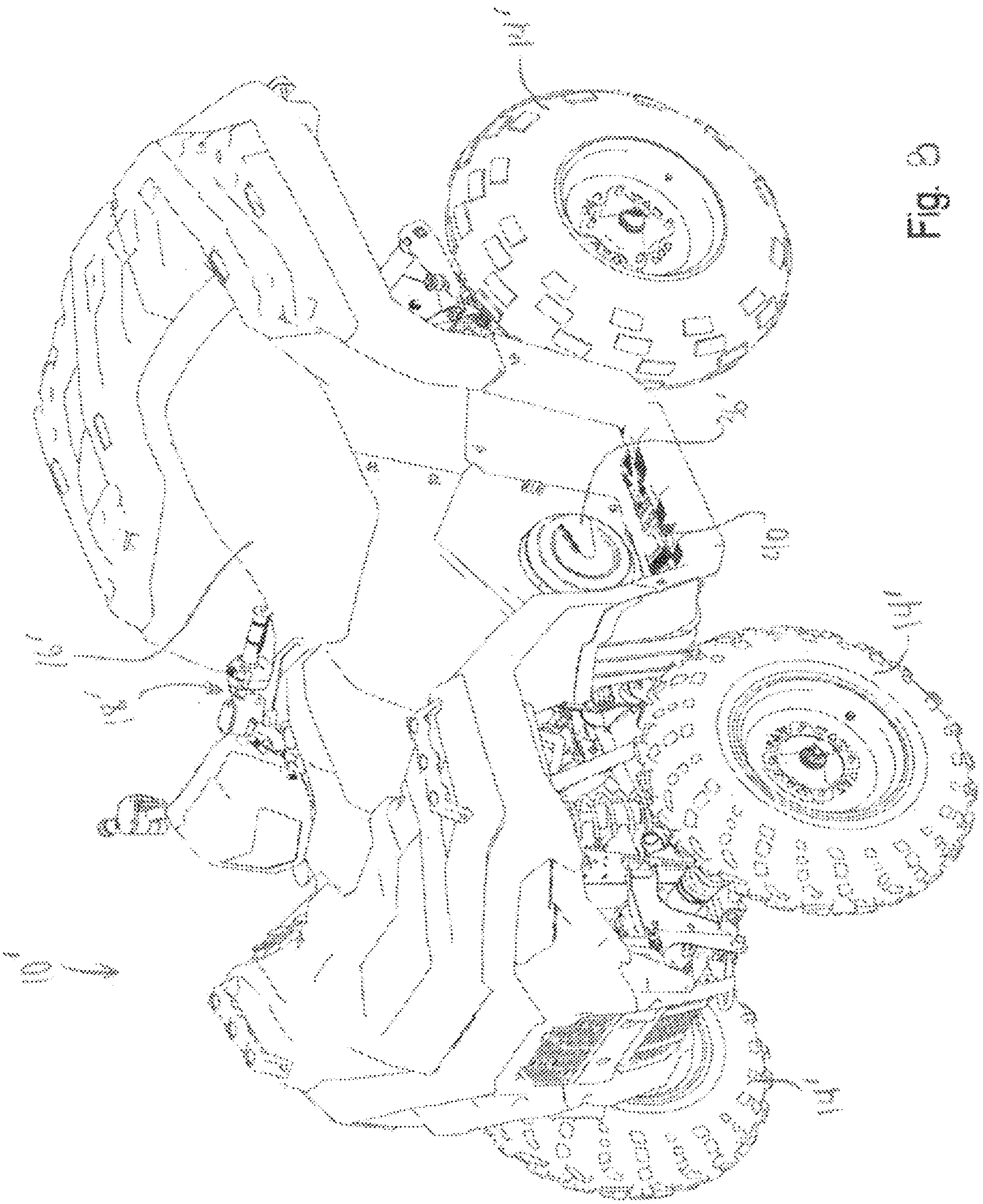
FIG. 8 is another exemplary vehicle having a foot support assembly made in accordance with the present disclosure.
Figure 9:
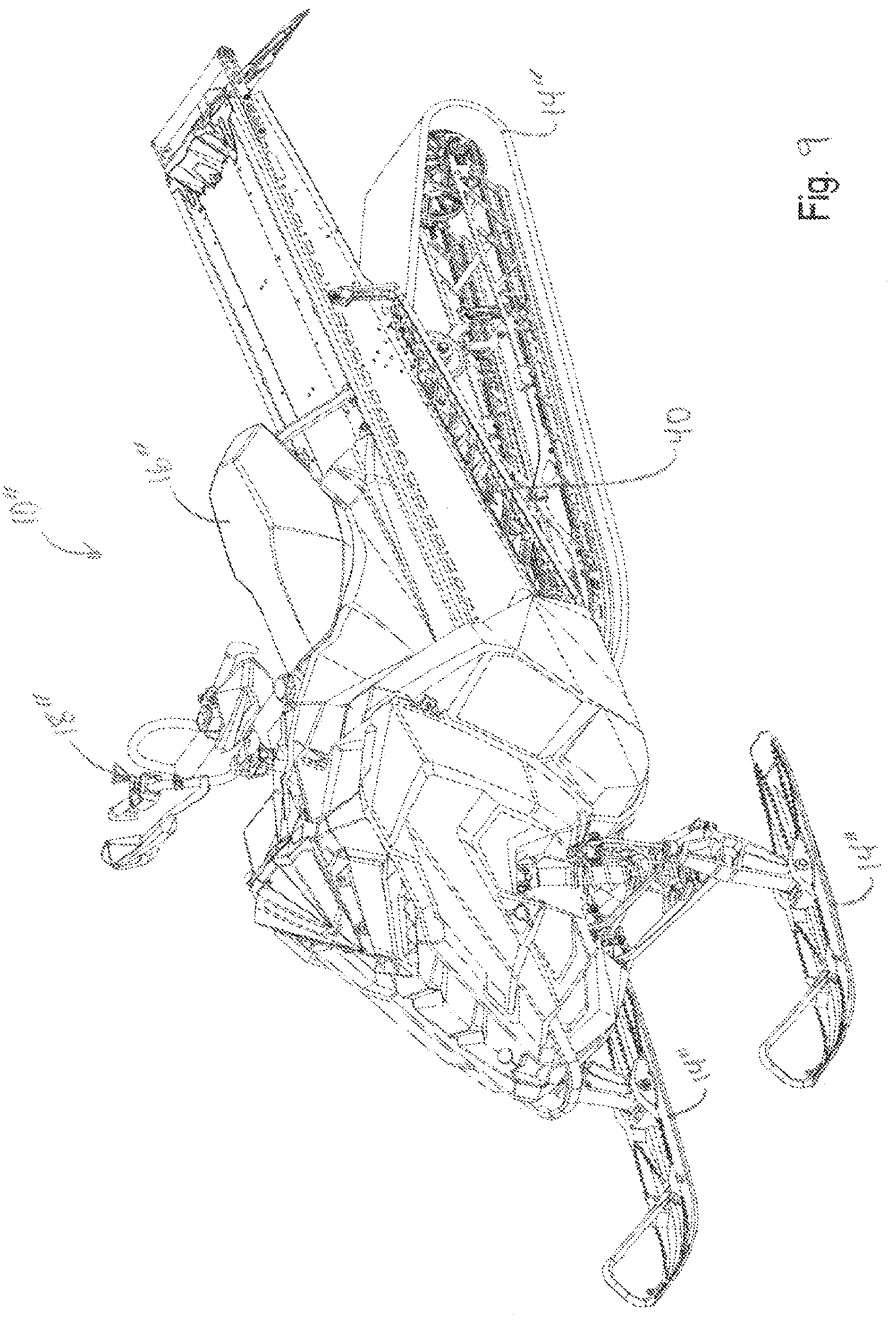
FIG. 9 is a further exemplary vehicle having a foot support assembly made in accordance with the present disclosure.

Moreover, foot support assembly 40 may be applied to any vehicle using a straddle seat, such as an all-terrain vehicle (ATV) 10' (FIG. 8) and a snowmobile 10" (FIG. 9). In FIG. 8, ATV 10' has similar components to motorcycle 10, with like components having like reference numerals, except with "'" (apostrophe) added thereto. ATV 10' has straddle seat 16' with foot support assembly 40 (and/or foot support assembly 80, not shown) applied to the underlying foot support surfaces of ATV 10' In this way, the foot supports of ATV 10' may be integrated into the frame of ATV 10' in a similar manner as discussed above in connection with motorcycle 10.

In FIG. 9, snowmobile 10" has similar components to motorcycle 10, with like components having like reference numerals, except with "' '" (double apostrophe) added thereto. Snowmobile 10" has straddle seat 16" with foot support assembly 40 (and/or foot support assembly 80, not shown) applied to the underlying foot support surfaces of snowmobile 10". In this way, the foot supports of snowmobile 10" may be integrated into the frame of snowmobile 10" in a similar manner as discussed above in connection with motorcycle 10.

The following clauses are provided as example aspects of the disclosed subject matter:

1. A foot support assembly for a vehicle is provided. The foot support comprising: a frame member having a first end configured to be fixed to a first frame component and a second end configured to be fixed to a second frame component; and a foot support connected directly to the frame member and sized to support a foot of a vehicle operator.

2 The foot support assembly of clause 1, wherein the foot support is pivotably connected to the frame member.

3. The foot support assembly of clause 1, further comprising an operator control pivotably mounted to the frame member and positioned to be actuated by an operator's foot while the operator's foot is resting on the foot support.

4. The foot support assembly of clause 3, wherein the operator control is a brake pedal.

5. The foot support assembly of clause 4, further comprising a brake master cylinder operably connected to the brake pedal.

The foot support assembly of clause 3, wherein the operator control is a foot-operated shifter.

7 The foot support assembly of any preceding clauses 1-6, wherein: the frame member defines a longitudinal axis extending from the first end to the second end. The frame member comprises a stanchion integrally fixed to the frame member and extending at least one of laterally and upwardly away from the longitudinal axis to a free end portion. The stanchion having a foot support mount at the free end portion.

8. The foot support assembly of clause 1, wherein the vehicle is a motorcycle.

9. A vehicle comprising: an engine; a frame supporting the engine; a plurality of ground engaging members; and a foot support assembly. The frame having at least a first frame component and a second frame component spaced from the first frame component to define a gap. At least one of the plurality of ground engaging members being operably connected to the engine. The foot support assembly comprising: a frame member positioned in the gap and removably fixed to the first and second frame components, such that the frame member creates a load-bearing, force-transferring link between the first frame component and the second frame component; and a foot support connected directly to the frame member and sized to support a foot of a vehicle operator.

10. The vehicle of clause 9, wherein: the first frame component comprises a frame component; and the second frame component comprises a component of the engine.

11. The vehicle of clause 10, wherein the second frame component comprises a crankcase.

12. The vehicle of clause 10, wherein the frame member of the foot support is removably fixed to the first and second frame components by a bolted connection.

13. The vehicle of clause 12, further comprising a fitting sized to be fitted into an end of the frame component, the fitting including a threaded aperture configured to receive the bolted connection.

14. The vehicle of clause 13, wherein the component of the engine includes the threaded aperture configured to receive the bolted connection.

15. The foot support assembly of any of clauses 9-14, further comprising an operator control pivotably mounted to one of the frame members and the engine, the operator control positioned to be actuated by an operator's foot while the operator's foot is resting on the foot support.

16. The vehicle of clause 15, further comprising a brake operably coupled to at least one of the plurality of ground engaging members, wherein the operator control is a foot-operated brake lever operably coupled to the brake.

17. The vehicle of clause 15, further comprising a transmission defining a plurality of gear ratios, wherein the operator control is a foot-operated shifter operably coupled to the transmission and configured to shift the transmission between the plurality of gear ratios.

18. The vehicle of any of clauses 9-14, wherein the foot support assembly comprises a pair of foot support assemblies respectively mounted to the left and right sides of the vehicle.

19. The vehicle of clause 18, further comprising: a brake operably coupled to at least one of the plurality of ground engaging members and actuated by a brake lever; and a transmission defining a plurality of gear ratios and actuated by a shifter, wherein one of the pair of foot support assemblies is positioned adjacent the brake lever and the other of the pair of the foot support assemblies is positioned adjacent the shifter.

While this invention has been described as having exemplary designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A vehicle comprising:

an engine including an engine component;

a frame supporting the engine, the frame having at least a first frame component, the first frame component spaced from the engine component to define a gap;

a plurality of ground engaging members, at least one of the plurality of ground engaging members operably connected to the engine;

a frame mounting member at least partially positioned in the gap, the frame mounting member configured to be fixed to the first frame component and the engine component to provide a first load-bearing, force-transferring link between the first frame component and the engine component when the frame mounting member is fixed to the first frame component and the engine component; and a foot support assembly comprising:

a first frame member positioned in and spanning the gap and removably coupled to the first frame component and the engine component, such that the first frame member creates a second load-bearing, force-transferring link between the first frame component and the engine component; and a foot support connected directly to the first frame member and sized to support a foot of a vehicle operator;

wherein the first frame member is removably fixed to the first frame component and the engine component by a first bolted connection and a second bolted connection, respectively.

2. The vehicle of claim 1, wherein the foot support is pivotably connected to the first frame member.

3. The vehicle of claim 1, further comprising an operator control pivotably mounted to the first frame member and positioned to be actuated by the foot of the vehicle operator while the foot of the vehicle operator is resting on the foot support.

4. The vehicle of claim 3, wherein the operator control is a brake pedal.

5. The vehicle of claim 3, wherein the operator control is a foot-operated shifter.

6. The vehicle of claim 1, wherein:

the first frame member defines a longitudinal axis extending from a first end coupled to the first frame component to a second end coupled to the engine component; and the first frame member comprises a stanchion integrally fixed to the first frame member and extending at least one of laterally and upwardly away from the longitudinal axis to a free end portion, the stanchion having a foot support mount at the free end portion.

7. The vehicle of claim 1, further comprising a fitting sized to be fitted into an end of the first frame component, the fitting including a first threaded aperture configured to receive the first bolted connection.

8. The vehicle of claim 1, wherein the foot support assembly comprises a pair of foot support assemblies respectively mounted to a left side and a right side of the vehicle.

9. The vehicle of claim 8, wherein;

at least one of the plurality of ground engaging members is operably coupled to a brake and actuated by a brake lever and further comprising a transmission defining a plurality of gear ratios and actuated by a shifter;

one of the pair of foot support assemblies is positioned adjacent the brake lever; and the other of the pair of the foot support assemblies is positioned adjacent the shifter.

10. The vehicle of claim 1, wherein:

the first frame member includes a first surface, the first surface is substantially flat; and the first frame component includes a second surface, the second surface is substantially flat, the second surface is configured to engage the first surface to form a substantially flat interconnection when the first frame member is fixed to the first frame component.

11. The vehicle of claim 1, wherein the first bolted connection includes a first threaded bolt and the second bolted connection includes a second threaded bolt.

12. The vehicle of claim 1, wherein the engine component comprises a crankcase.

13. A vehicle comprising:

an engine including a crankcase;

a frame supporting the engine, the frame having at least a first frame component, the first frame component spaced from the crankcase to define a gap;

a plurality of ground engaging members, at least one of the plurality of ground engaging members operably connected to the engine;

a foot support assembly comprising:

a first frame member positioned in and spanning the gap and removably coupled to the first frame component and the crankcase, such that the first frame member creates a load-bearing, force-transferring link between the first frame component and the crankcase; and a foot support connected directly to the first frame member and sized to support a foot of a vehicle operator; and a second frame member at least partially positioned in the gap, the second frame member configured to be fixed to the first frame component and the crankcase to provide a second load-bearing, force-transferring link between the first frame component and the crankcase when the second frame member is fixed to the first frame component and the crankcase.

14. The vehicle of claim 13, wherein the first frame member is removably fixed to the first frame component and the crankcase by a first bolted connection and a second bolted connection, respectively.

15. The vehicle of claim 14, further comprising a fitting sized to be fitted into an end of the first frame component, the fitting including a first threaded aperture configured to receive the first bolted connection.

16. The vehicle of claim 13, further comprising an operator control pivotably mounted to one of the first frame member or the engine, the operator control positioned to be actuated by the foot of the vehicle operator while the foot of the vehicle operator is resting on the foot support.

17. The vehicle of claim 16, wherein at least one of the plurality of ground engaging members is operably connected to a brake, wherein the operator control is a foot-operated brake lever operably coupled to the brake.

18. The vehicle of claim 16, further comprising a transmission defining a plurality of gear ratios, wherein the operator control is a foot-operated shifter operably coupled to the transmission and configured to shift the transmission between the plurality of gear ratios.

19. The vehicle of claim 13, wherein the foot support assembly comprises a pair of foot support assemblies respectively mounted to a left side and a right side of the vehicle.

20. The vehicle of claim 19, wherein at least one of the plurality of ground engaging members is operably coupled to a brake and actuated by a brake lever and further comprising a transmission defining a plurality of gear ratios and actuated by a shifter, wherein one of the pair of foot support assemblies is positioned adjacent the brake lever and the other of the pair of the foot support assemblies is positioned adjacent the shifter.

* * * * *